(12) United States Patent
Simmons

(10) Patent No.: US 6,425,317 B1
(45) Date of Patent: Jul. 30, 2002

(54) COFFEE MAKER FILTER BASKET WITH STEEPING FEATURE

(75) Inventor: Sean Simmons, Sea Cliff, NY (US)

(73) Assignee: Objective Design, Sea Cliff, NY (US)

(*) Notice: Subject to any disclaimer, the term of this patent is extended or adjusted under 35 U.S.C. 154(b) by 0 days.

(21) Appl. No.: 09/660,137

(22) Filed: Sep. 12, 2000

(51) Int. Cl.$^7$ ................................................ A47J 31/46
(52) U.S. Cl. ........................... 99/299; 99/306; 99/323; 426/433; 426/435
(58) Field of Search .......................... 99/299, 323, 306, 99/304, 307, 283, 295, 279; 426/433, 435

(56) References Cited

U.S. PATENT DOCUMENTS

| | | | |
|---|---|---|---|
| 673,371 A | 4/1901 | Thorp | |
| 2,365,269 A | 5/1944 | Hill | |
| 2,868,110 A | 1/1959 | Kehoe | |
| 3,833,125 A | 9/1974 | Schwartz | |
| 3,853,043 A | 12/1974 | Stavropoulos | |
| 3,987,717 A | 10/1976 | Bergmann et al. | |
| 4,064,795 A | 12/1977 | Ackerman | 99/304 |
| 4,103,603 A | 8/1978 | Bergmann et al. | 99/294 |
| 4,108,053 A | 8/1978 | Vink | 99/306 |
| 4,150,608 A | 4/1979 | Hirschberg et al. | 99/306 |
| 4,527,467 A | * 7/1985 | Siemensma | 99/279 |
| 4,697,502 A | 10/1987 | English et al. | 99/299 |
| 4,771,680 A | * 9/1988 | Snowball et al. | 99/295 |
| 4,832,845 A | 5/1989 | Hendretti | 210/470 |
| 5,102,546 A | 4/1992 | Salomon | 210/469 |
| 5,150,448 A | 9/1992 | Salomon | 392/480 |
| 5,211,104 A | 5/1993 | Arpin | 99/295 |
| 5,231,918 A | 8/1993 | Grzywna | 99/295 |
| 5,239,914 A | 8/1993 | Salomon et al. | 99/235 |
| 5,249,509 A | 10/1993 | English | 99/285 |
| 5,280,560 A | 1/1994 | Salomon | 392/467 |
| 5,287,797 A | 2/1994 | Grykiewicz et al. | 99/295 |
| 5,290,444 A | 3/1994 | Campbell | 210/473 |
| 5,669,287 A | 9/1997 | Jefferson, Jr. et al. | 99/299 |
| 5,746,113 A | 5/1998 | Ko | 99/323 |
| 5,894,786 A | 4/1999 | Miya | 99/306 |
| 5,927,179 A | 7/1999 | Mordini et al. | 99/304 |
| 6,012,379 A | 11/2000 | Matuschek | 99/323 |

FOREIGN PATENT DOCUMENTS

| DE | 2829775 | * 1/1980 | 99/306 |
|---|---|---|---|

* cited by examiner

*Primary Examiner*—Reginald L. Alexander
(74) *Attorney, Agent, or Firm*—Dilworth & Barrese, LLP

(57) ABSTRACT

The present invention is directed to a filter basket having a wall configured to form a basket. The wall has a drain hole formed in a lower portion thereof and a regulating member for regulating a flow of liquid flowing through the basket into the drain hole. One embodiment includes a pair of planar surfaces positioned within the basket and connected to an inner surface of the wall; the pair of planar surfaces define a longitudinal slot therebetween. The size of the slot is configured to restrict the flow of fluid through the basket to maintain a predetermined level of fluid within the basket for a predetermined dwell period of about five minutes to about seven minutes. A method of brewing a beverage is also disclosed including the steps of placing a plurality of beverage flavor elements within a filter basket, dispensing water over the plurality of beverage flavor elements within the filter basket at a predetermined flow rate, providing structure within the filter basket to restrict the flow of water through the filter basket such that a level of water in the basket rises to a predetermined level at which the flow rate of water into the filter basket equals a flow rate of water out of the basket, and continuing dispensing water over the plurality of beverage flavor elements for a predetermined dwell period after the flow rate of water into the filter basket equals the flow rate of water out of the basket.

24 Claims, 7 Drawing Sheets

COFFEE MAKER FILTER BASKET WITH STEEPING FEATURE

BACKGROUND OF THE INVENTION

1. Field of the Invention

The present invention relates to an apparatus and method of brewing coffee and, more particularly, to an apparatus and method of brewing coffee utilizing a novel coffee maker filter basket with a steeping feature.

2. Description of the Related Art

Over the course of time, there have been several attempts at new apparatus and methods for brewing a rich and robust cup (or pot) of coffee. For example, an ancient method of brewing coffee, referred to as the "jug", included the steps of pouring hot water over coffee grounds in a stoneware jug and letting the grounds soak for approximately five hours. The coffee was carefully poured out of the jug in an attempt to avoid pouring grounds into the cup.

A more recent version of the jug method, referred to as a plunger pot or french press, employs a glass cylinder with a top having a plunger rod passing therethrough. The rod is attached to a metal filter that fits securely inside the cylinder. To make coffee, the coffee grounds and hot water are placed in the cylinder and the grounds are allowed to steep for a predetermined period of time (approximately three to five minutes). This will give the coffee grounds time to swell and the water will extract the flavor from the coffee grounds. Finally, the plunger is pressed down to force the grounds to the bottom of the cylinder and the coffee above the plunger may be consumed.

Today, automatic drip coffee makers are common and convenient means for making coffee. Coffee is made by dispensing water from a reservoir through the ground coffee and into a carafe below for serving. The automatic drip coffee makers typically include at least the following elements: a water reservoir for storing a predetermined amount of water relative to the quantity of coffee the user intends to brew; a heating element for heating the water stored in the water reservoir prior to the water being dispensed over the coffee grounds; a basket for housing a coffee filter and coffee grounds; a carafe for receiving the water after it passes over the coffee grounds and through the coffee filter; and a heating element for keeping the carafe of brewed coffee warm.

However, in today's automatic drip coffee makers, the flavor of the coffee is not as rich and robust as it could be, due to the amount of steeping that the coffee grounds are subject to (or not subject to). The term steeping refers to the amount of soaking or wetting that the coffee grounds undergo. If the coffee grounds merely get wetted out (i.e., the grounds just get wet, but they do not get wet enough to brew), the quality and taste of the coffee will suffer.

Thus, in order to brew a rich and robust pot of coffee in an automatic drip coffee maker, there have been several attempts in the prior art to regulate the flow rate of water over the coffee grounds, thereby regulating the amount of steeping. For example, in conventional coffee makers the heating element may be configured to regulate the flow rate of the water.

A filter basket is commonly used within a coffee maker to support the filter which carries the coffee grounds. Conventional filter baskets are typically conical in shape with a large opening on top and a relatively small outlet hole in the bottom. The hot water enters the large opening in the top, passes over the coffee grounds in the filter and exits through the small outlet hole in the bottom.

The prior art also discloses various by-pass configurations for regulating the flow of water through the filter basket. For example, U.S. Pat. No. 4,108,053 discloses a variable brew coffee maker which includes a spreader plate-spreader basket assembly for selectively proportioning the amount of water directed into the coffee grounds and the amount of water directed via an overflow duct which by-passes the coffee grounds directly into the receptacle for diluting the brewed coffee therein. Also, U.S. Pat. No. 5,249,509 discloses a device to vary the strength of a brewed beverage wherein the desired strength is achieved by controlling the volume of hot water contacting the beverage particles. This goal is achieved by varying the size of a slot to bypass more or less of the hot water around the filter containing the particles. However, these types of systems disclose apparatus and methods for making a weaker cup of coffee, not a richer and more robust cup of coffee.

Moreover, the size of the outlet hole in the basket often allows the water flow that is entering the basket to flow out of the basket without any restriction. Therefore the coffee grinds get wet and they don't have an opportunity to properly steep.

Thus, a need exists for a filter basket which may be used in an automatic drip coffee maker which will provide enhanced steeping, thereby producing rich and robust coffee.

SUMMARY OF THE INVENTION

It is an object of the present invention to provide a filter basket which may be used in an automatic drip coffee maker which will provide enhanced steeping, thereby producing rich and robust coffee. It is also an object of this invention to provide an inexpensive and automatic apparatus and method for creating a steeping cycle in a coffee maker.

One embodiment of the filter basket in accordance with the present invention includes a wall configured to form a basket, the wall having a drain hole formed in a lower portion thereof; and means for regulating a flow of liquid flowing into the basket into the drain hole. To use the filter basket in hot beverage applications, such as brewing coffee, the filter basket must be formed of a plastic material capable of withstanding a temperature of at least 212 degrees Fahrenheit. To receive conically shaped filters, the filter basket may be substantially conically shaped.

One embodiment of the means for regulating a flow of liquid includes a pair of planar surfaces positioned within the basket and connected to an inner surface of the wall, wherein the pair of planar surfaces define a longitudinal slot therebetween. The slot may be defined by separating the pair of planar surfaces or by staggering the pair of planar surfaces.

The slot has a first end and a second end wherein a width of the slot is greater in the first end than in the second end. The size of the slot is configured to restrict the flow of fluid through the basket to maintain a predetermined level of fluid within the basket for a predetermined dwell period. The predetermined dwell period is preferably in the range of about five minutes to about seven minutes. The wall also includes a first end and a second end, wherein the first end defines an inlet opening for receiving a filter and coffee grounds.

Another embodiment of the means for regulating a flow of liquid includes a planar surface positioned within the basket and connected to an inner surface of the wall, wherein the planar surface has a longitudinal slot formed at least partially therein and a hole formed in a lower portion thereof.

An adjustable means for regulating a flow of liquid through a filter basket is also disclosed. The adjustable means for regulating a flow of liquid includes a tube mounted within the basket adjacent to the drain hole and an adjustment rod positioned within the tube. Each of the tube and the adjustment rod have at least one longitudinal slot formed therein for regulating the flow of liquid from the basket through the drain hole. The adjustment rod preferably has a plurality of longitudinal slots of varying length formed therein.

Yet another embodiment of the means for regulating a flow of liquid includes a planar surface positioned within the basket and connected to an inner surface of said wall and a bimetallic strip. The planar surface has a longitudinal slot formed at least partially therein and a hole formed in a lower portion thereof. The bimetallic strip is positioned adjacent to the planar surface and covers the longitudinal slot.

Still yet another embodiment of the means for regulating a flow of liquid includes a tube mounted within the basket adjacent to the drain hole, a valve positioned within the tube and seated within the drain hole, and a bimetallic spring attached at a first end to an upper end of the valve and at a second end to a top of the tube. Movement of the spring causes movement of the valve to open or close the drain hole.

Yet another embodiment of the means for regulating a flow of liquid includes a tube mounted within the basket adjacent to the drain hole, a bimetallic strip connected at a first end to the wall, and a plug mounted on a second end of the bimetallic strip and positioned within a second drain hole formed in a lower portion of the wall.

In another embodiment, the filter basket includes a base having at least one drain hole formed therein; an outer wall connected to and extending from the base; and an inner wall connected to and extending from the base. The inner wall has at least one slot formed therein perpendicular to a plane of the base. The outer wall and inner wall define a channel therebetween and the drain hole formed in the base is in fluid communication with the channel.

A method of brewing a beverage is also disclosed including the steps of placing a plurality of beverage flavor elements within a filter basket; dispensing water over the plurality of beverage flavor elements within the filter basket at a predetermined flow rate; providing structure within the filter basket to restrict the flow of water through the filter basket such that a level of water in the basket rises to a predetermined level at which the flow rate of water into the filter basket equals a flow rate of water out of the basket; and continuing dispensing water over the plurality of beverage flavor elements for a predetermined dwell period after the flow rate of water into the filter basket equals the flow rate of water out of the basket. Dispensing the water is continued for a time period in the range of about five minutes to about seven minutes.

These and other objects, features and advantages of the present invention will become apparent from the following detailed description of illustrative embodiments, which is to be read in connection with the accompanying drawings.

BRIEF DESCRIPTION OF THE DRAWINGS

For a better understanding of the invention, reference is made to the following description of exemplary embodiments thereof, and to the accompanying drawings, wherein.

DETAILED DESCRIPTION OF PREFERRED EMBODIMENTS

Figure 1:
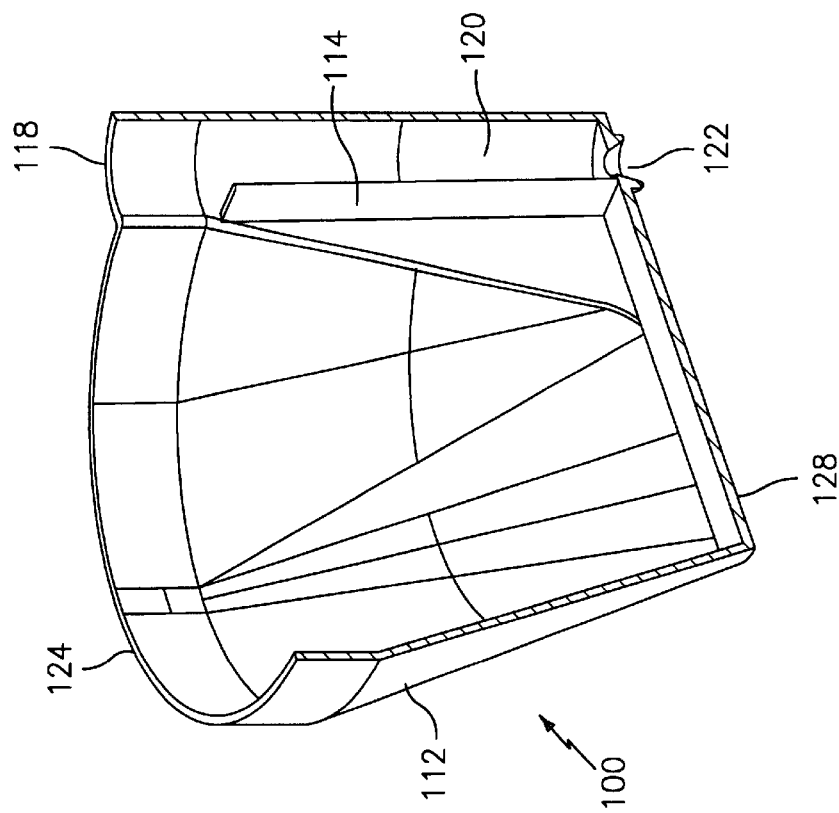
FIG. 1 is a perspective view illustrating a coffee maker filter basket with steeping feature in accordance with the present invention.
Figure 2:
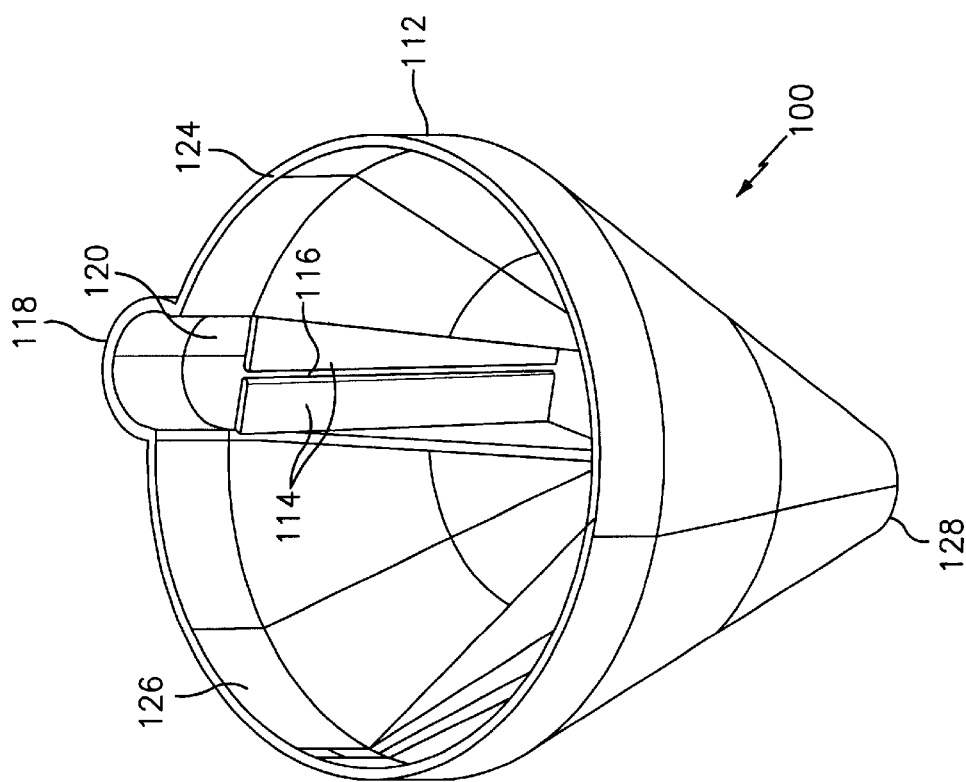
FIG. 2 is a cut-away perspective view illustrating the coffee maker filter basket with steeping feature of FIG. 1.
Figure 5:
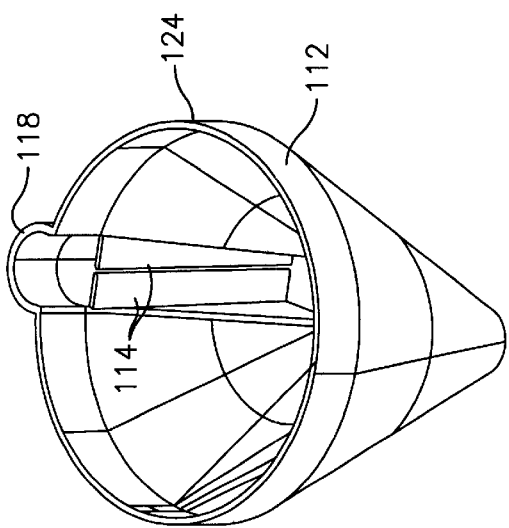
FIG. 5 is a top perspective view illustrating the coffee make filter basket with steeping feature of FIG. 1.
Figure 6:
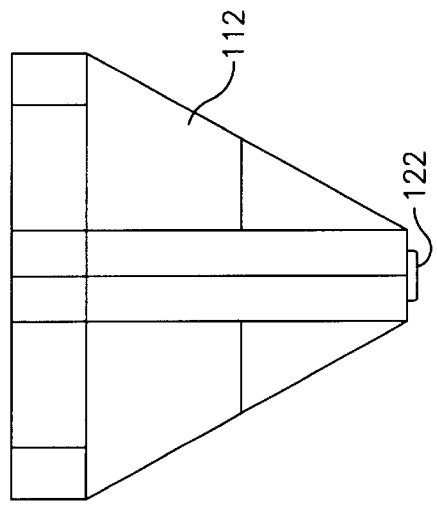
FIG. 6 is a side plan view illustrating the coffee make filter basket with steeping feature of FIG. 1.
Figure 3:
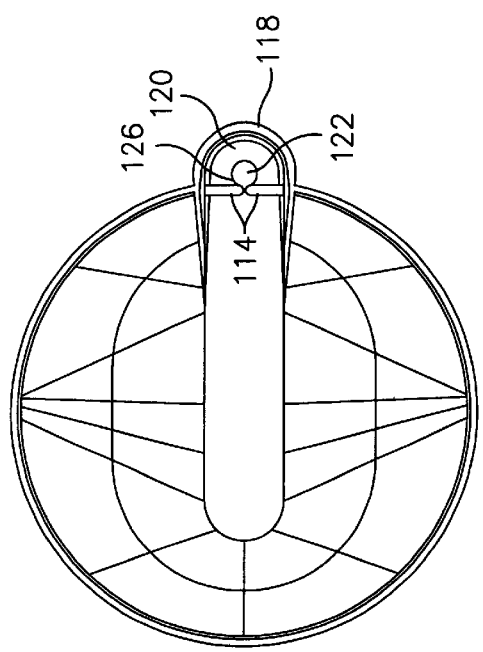
FIG. 3 is a top plan view illustrating the coffee maker filter basket with steeping feature of FIG. 1.
Figure 4:
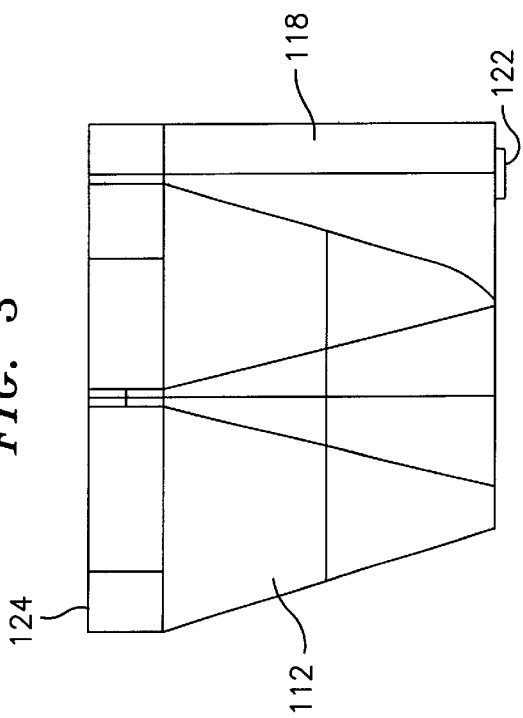
FIG. 4 is a side plan view illustrating the coffee make filter basket with steeping feature of FIG. 1.

The present disclosure describes a novel coffee maker filter basket with a steeping feature that automatically ensures that the coffee grounds within the filter basket will be properly steeped to provide a rich and robust cup of coffee.

Referring now in specific detail to the drawings in which like reference numerals identify similar or identical elements throughout the several views, and initially to FIGS. 1 through 6, one embodiment of a novel coffee maker filter basket with a steeping feature constructed in accordance with the present disclosure is shown generally as filter basket 100.

In accordance with the present invention, filter basket 100 includes a substantially conically shaped outer wall 112, a pair of inner sloped walls 114 which define a longitudinal slot 116 formed therebetween, a protrusion 118 defining a chamber 120 behind sloped walls 114, and a drain hole 122 formed in the lower portion of protrusion 118. Filter basket 100 is preferably formed of a plastic material capable of withstanding the temperature of the hot water entering the basket. The temperature of the hot water is preferably between 195 and 205 degrees Fahrenheit and may be up to approximately 212 degrees Fahrenheit.

A first end 124 of outer wall 112 defines a relatively large inlet opening 126 for receiving a filter and coffee grounds (not shown). Hot water in either a stream or spray is then dispersed from a heating element within a coffee maker (not shown) over the coffee grounds to extract the coffee flavor from the coffee grounds. A second end 128 of outer wall 112 is continuous with the exception of drain hole 122.

In accordance with the present invention, the width of slot 116 is designed such that when the hot water first enters basket 100, the flow of hot water through the basket is restricted and therefore begins filling basket 100 from the bottom up. As the water level within basket 100 rises, the amount of water draining through slot 116 increases. Initially, since the flow rate of water entering basket 100 is greater than the flow rate of water that is able to pass through the area of the opening of slot 116, the water level continues to rise within basket 100. Eventually as the water level within the basket rises, more and more of the opening of slot 116 is exposed to the water, thereby allowing more water to flow through slot 116. Ultimately, the flow rate of water through slot 116 will equal the flow rate of water into basket 100 and a predetermined desired water level will be maintained within the basket. Thus, the size of the opening created by slot 116 is designed to maintain a desired water level at which equilibrium between the inlet and outlet water flows is finally reached.

By continuing to add water into basket 100, a dwell period is created and maintained within basket 100 wherein the coffee grounds will be immersed in a given quantity of water. That is, the restriction created by slot 116 will cause the coffee grounds to soak within a given volume of water for a definite period of time. Thus, the coffee grounds will be properly steeped resulting in a rich and robust cup of coffee.

The volume of water within basket 100 at the equilibrium point is a function of the flow rate entering the basket and the dimensions of the slot 116. By performing tests with a predetermined quantity of coffee grounds and a predetermined volume of water, various dwell periods may be plotted graphically as the amount of extracted solids in solution (expressed as a percentage) as a function of the total amount of solids extracted (expressed as ounces per pound) to indicate dwell periods resulting in weak, ideal or strong tasting coffee. The tests can also indicate whether the coffee tastes bitter or is properly developed. By knowing factors such as the flow rate of water into the filter basket, the quantity of coffee grounds within the basket, the size of the basket, and the desired coffee taste, the slot 116 in basket 100 may be designed to achieve a coffee with the desired coffee taste.

To brew a rich and robust carafe of coffee, the dwell period is in the range of about three minutes to about seven minutes while a preferred dwell period is in the range of about five minutes to about seven minutes. Therefore, if the total time to brew a carafe of coffee takes eight to ten minutes, the slot should be sized such that equilibrium between the volume of water entering the basket and the volume of water exiting the basket is reached in approximately three minutes.

Walls 114 are connected to an inner surface of outer wall 112 and, in conjunction with protrusion 118, define chamber 120. Therefore, as the water flows through slot 116, which is defined by walls 114, it empties into chamber 120. Drain hole 122 is provided in the lower portion of protrusion 118 to drain all of the water that enters chamber 120. The water that exits through drain hole 122 will include the coffee flavor and will drain into a carafe or cup (not shown) positioned below the hole.

Figure 7:
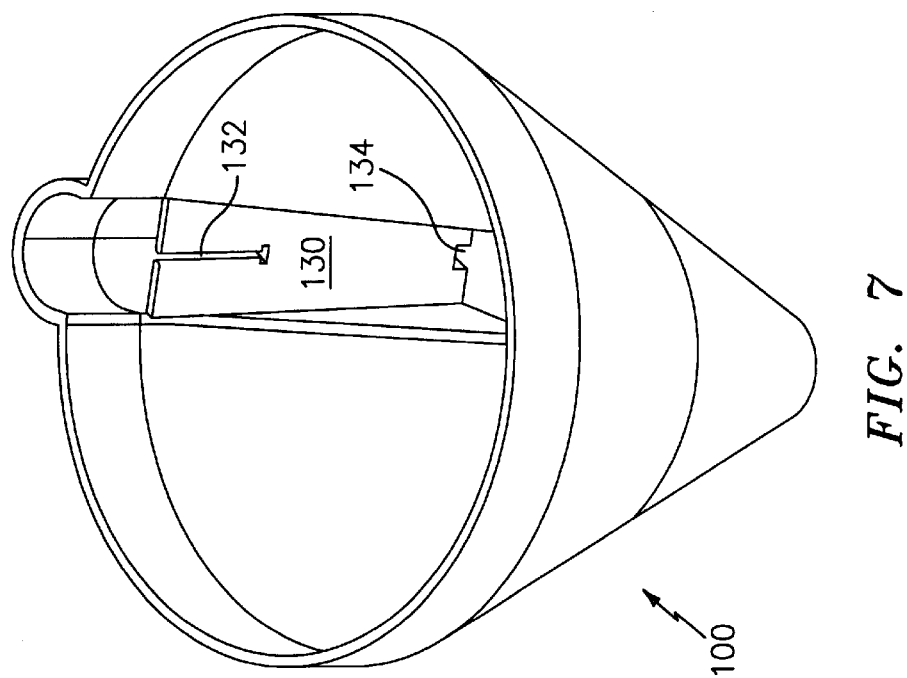
FIG. 7 is a top perspective view illustrating another embodiment of a coffee maker filter basket with steeping feature in accordance with the present invention.

Referring now to FIG. 7, another embodiment of a coffee maker filter basket with steeping feature in accordance with the present invention is illustrated. In this embodiment, a means for regulating the flow of water through basket 100 is provided by vertical wall 130. As shown, vertical wall 130 defines a slot 132 and a weep hole 134.

Slot 132 extends downward from a top edge of vertical wall 130 and terminates at a predetermined location below the top edge. The length of slot 132 may vary depending on a particular application or desired result. In a preferred embodiment, slot 132 will terminate at a height within basket 100 which corresponds to the level required to brew four cups of coffee.

Weep hole 134 is positioned in the bottom section of wall 130. The purpose of weep hole 134 is two-fold. First, it permits all of the liquid within basket 100 to drain out of the basket into the area behind wall 130. Second, weep hole 134 restricts the flow of liquid which enters the basket to create a dwell period so that the coffee grounds within the basket are properly steeped. The configuration of the means for restricting the flow of fluid through basket 100 illustrated in FIG. 7 advantageously causes the coffee to back up quickly to a height corresponding to a four cup setting.

Figure 8:
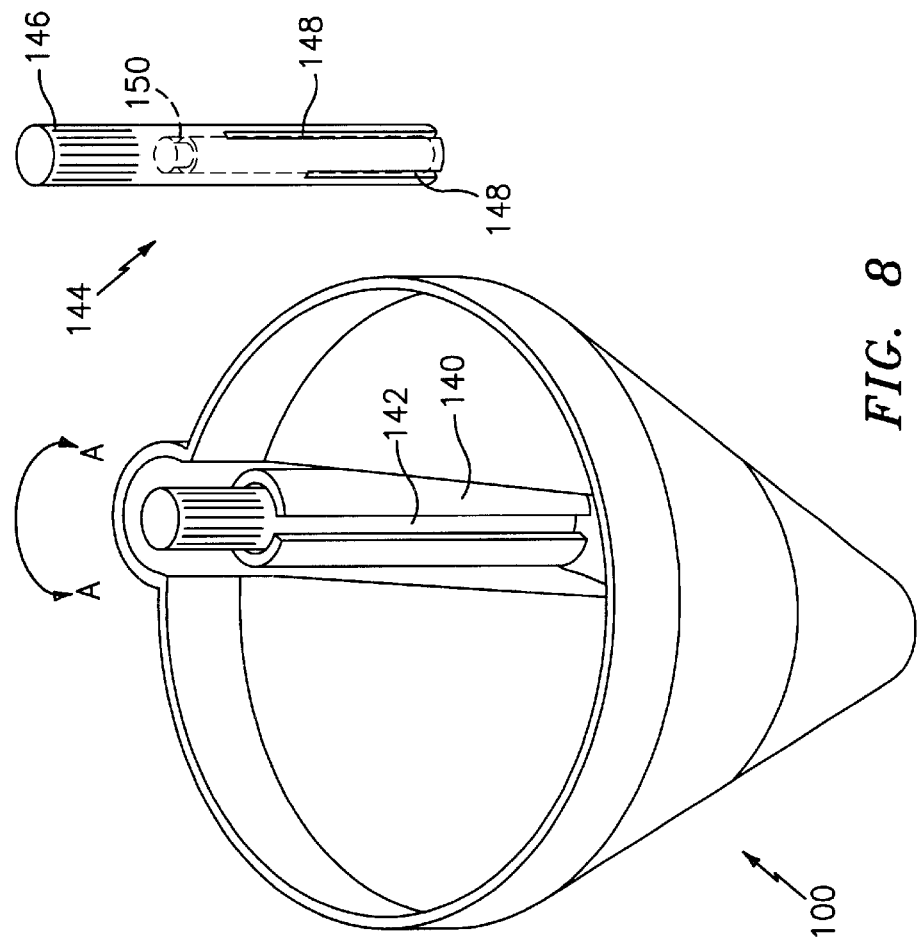
FIG. 8 is a top perspective view illustrating another embodiment of a coffee maker filter basket with steeping feature in accordance with the present invention.
Figure 9:
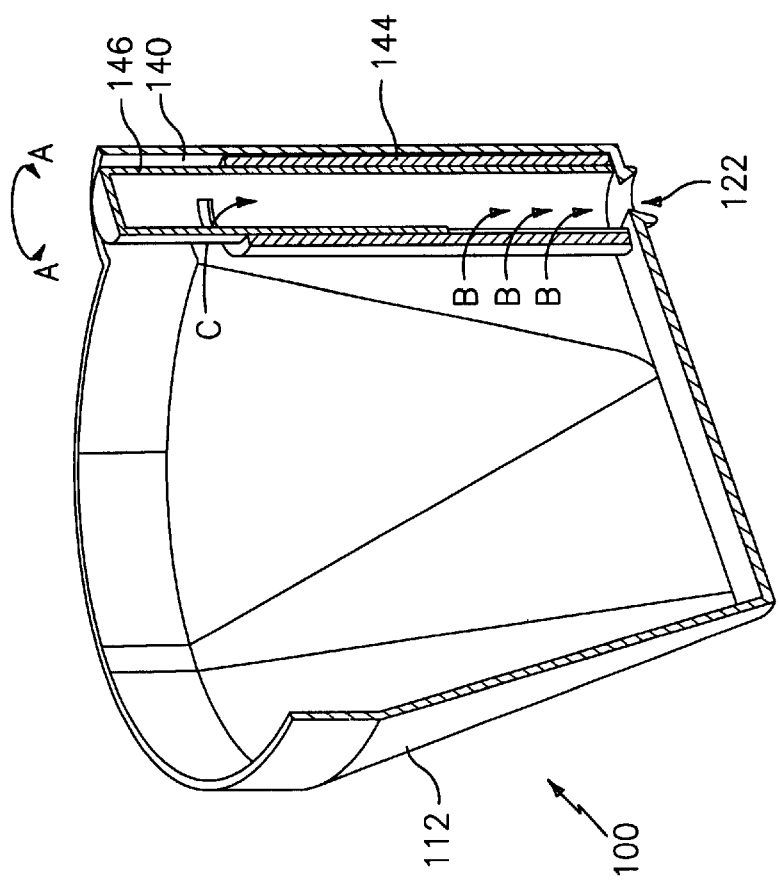
FIG. 9 is a cut-away perspective view illustrating the coffee maker filter basket with steeping feature of FIG. 8.

FIGS. 8 and 9 illustrate yet another embodiment of a coffee maker filter basket with steeping feature in accordance with the present invention. FIGS. 8 and 9 illustrate a coffee maker filter basket having an adjustable means for restricting the flow of liquid through the basket to create a dwell period. More specifically, a vertical tube 140 is mounted above drain hole 122. Vertical tube 140 has a longitudinal slot 142 formed therein. Slot 142 is exposed to liquid which enters basket 100 and communicates that liquid through drain hole 122. A lower end of vertical tube 140 is preferably molded to the bottom of outer wall 112 around the perimeter of drain hole 122.

To further restrict the flow of liquid exiting basket 100 through drain hole 122, a hollow cylindrical rod 144 is positioned within vertical tube 140. Rod 144 has a knurled first end 146 to assist the user when rotating the rod to make adjustments to the flowrate of fluid leaving basket 100, as will be discussed in further detail below. A plurality of longitudinal slots 148 of varying length are formed in rod 144. The fit between rod 144 and vertical tube 140 creates a seal so that fluid will not flow between the two tubular walls and will only flow through slots 142 and 148. Alternatively, rod 140 may be configured to accept one or more o-rings to provide a seal between the outer circumference of rod 144 and the inner surface of tube 140.

As discussed above, rod 144 includes a plurality of longitudinal slots 148. To facilitate adjustment of the dwell period and thus the steeping process, the user simply rotates rod 144 in the direction of arrows A—A until a slot 148 having the desired length is aligned with slot 142. Therefore, liquid within basket 100 will flow through slot 142 and through slot 148 as indicated by arrows B (see FIG. 9). A longer slot 148 will result in a shorter dwell period and vice versa. Rod 144 also includes a hole 150 adjacent to the first knurled end 146. Hole 150 functions as an overflow hole once basket 100 is filled to the desired level for steeping the measured amount of grounds. Thus, if the liquid within basket 100 exceeds a predetermined level, it will flow into hole 150 as indicated by arrow C.

Figure 10:
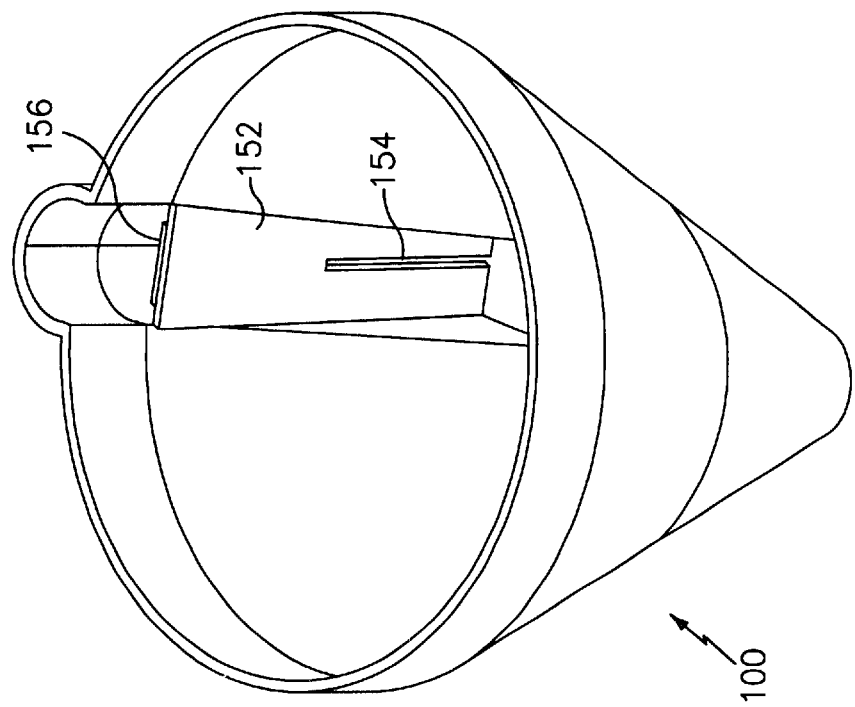
FIG. 10 is a top perspective view illustrating another embodiment of a coffee maker filter basket with steeping feature in accordance with the present invention.
Figure 11:
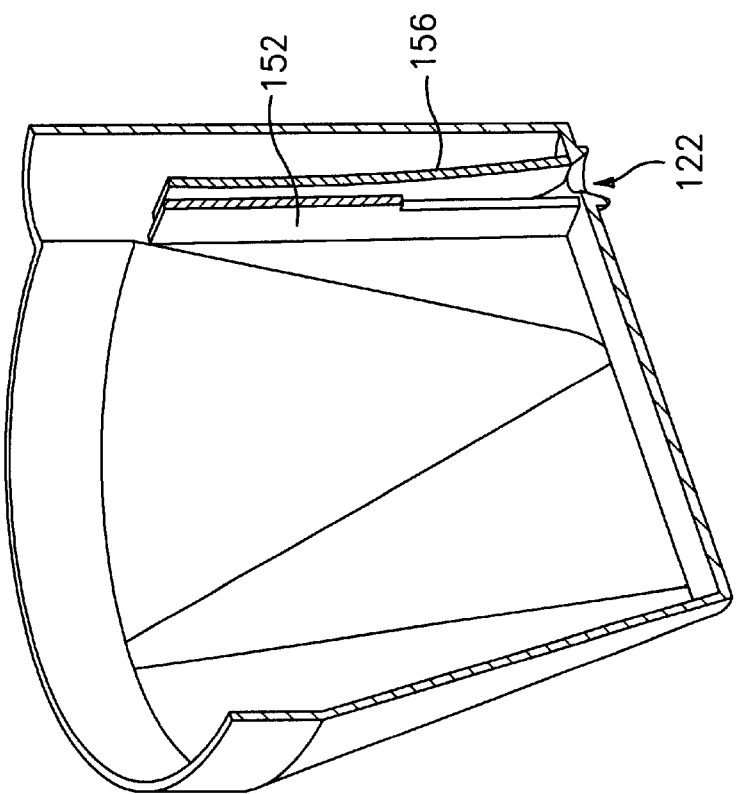
FIG. 11 is a cut-away perspective view illustrating the coffee maker filter basket with steeping feature of FIG. 10.

Referring now to FIGS. 10 and 11, there is shown another embodiment of a coffee maker filter basket with a steeping feature in accordance with the present invention. A vertical wall 152 positioned within filter basket 100 has a longitudinal slot 154 formed in a lower portion thereof. A bimetallic strip 156 is positioned adjacent to and behind wall 152. When not in use, strip 156 substantially seals the opening formed by slot 154. Since slot 154 is initially sealed by strip 156, when water is added to basket 100 the basket will fill up at a rate which is equivalent to the flow rate of the water entering the basket. However, when the basket begins to flow over wall 152, the overflowing liquid will contact the thermally sensitive strip 156 and cause strip 156 to bend away from slot 154, thus leaving slot 154 unrestricted. The fluid within basket 100 will then begin to flow through slot 154 until a desired equilibrium level within the basket is achieved.

Figure 12:
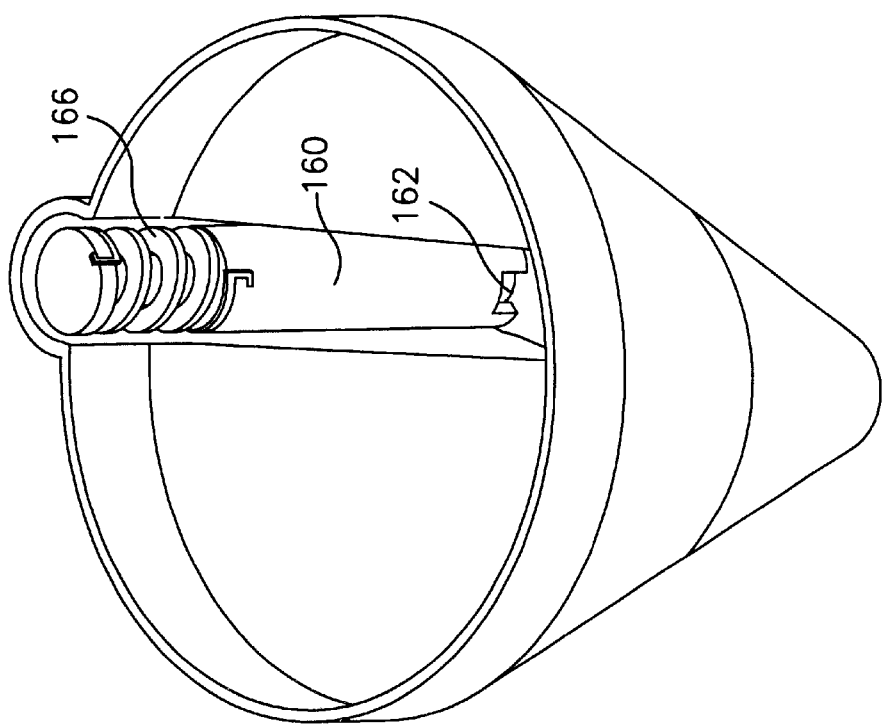
FIG. 12 is a top perspective view illustrating another embodiment of a coffee maker filter basket with steeping feature in accordance with the present invention.
Figure 13:
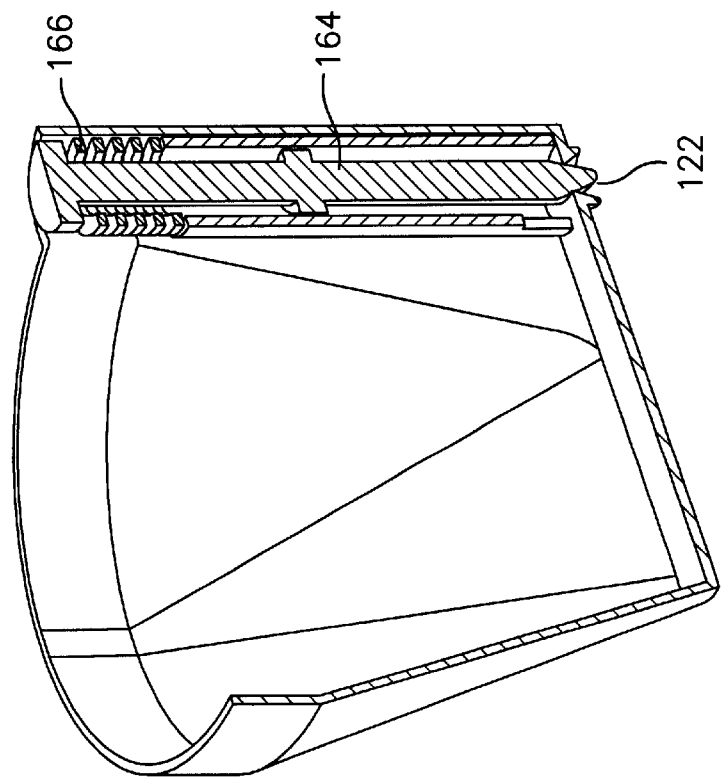
FIG. 13 is a cut-away perspective view illustrating the coffee maker filter basket with steeping feature of FIG. 12.

FIGS. 12 and 13 illustrate yet another embodiment of a coffee maker filter basket with steeping feature in accordance with the present invention. FIGS. 12 and 13 illustrate a coffee maker filter basket having an automatic means for restricting the flow of liquid through the basket and creating a dwell period within the basket. More specifically, a vertical tube 160 is mounted above drain hole 122. A lower end of vertical tube 160 is preferably molded to the bottom of outer wall 112 around the perimeter of drain hole 122. A hole 162 is formed in the lower end of tube 160. A valve 164 is positioned within tube 160 with an end of valve 164 positioned within drain hole 122 to prevent any liquids from flowing through drain hole 122 via hole 162.

A helical bimetallic spring 166 is connected at a first end to the top of valve 164 and at a second end to the top edge of tube 160. When liquid first enters basket 100 it is prevented from flowing through the drain hole 122 by valve 164. However, as the water level rises and contacts spring 166, spring 166 extends upwards thereby forcing valve 164 upward and opening drain hole 122. The dimensions of hole 162 and drain hole 122 will determine the flow rate of liquid through the basket and therefore the height at which equilibrium will be reached within basket 100.

Figure 14:
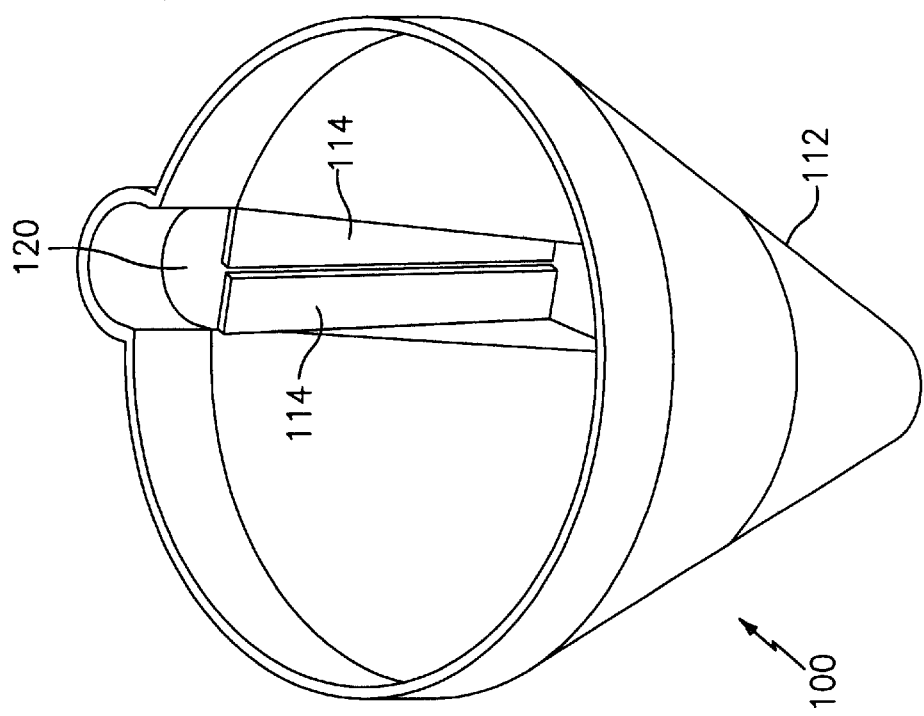
FIG. 14 is a top perspective view illustrating another embodiment of a coffee maker filter basket with steeping feature in accordance with the present invention.
Figure 15:
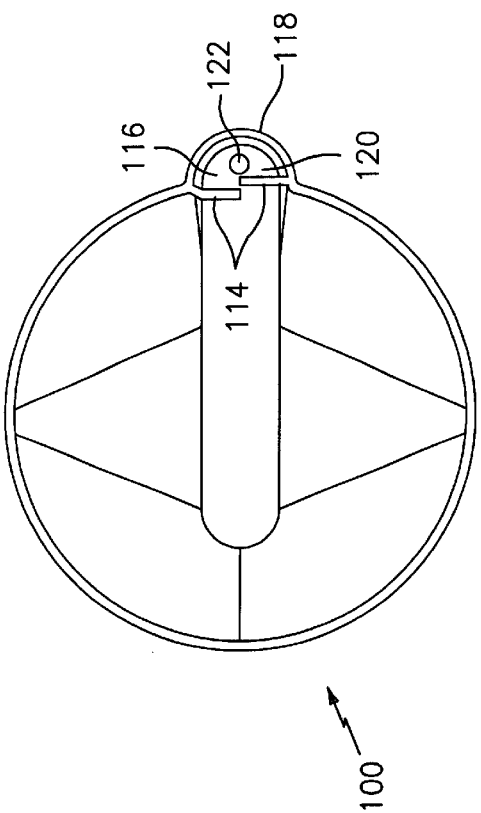
FIG. 15 is a top plan view illustrating the coffee maker filter basket with steeping feature of FIG. 14.

FIGS. 14 and 15 illustrate yet another embodiment of a coffee maker filter basket with steeping feature in accordance with the present invention. Filter basket 100 as illustrated in FIGS. 14 and 15 has many of the features shown in the embodiment shown in FIGS. 1 through 6 including a substantially conically shaped outer wall 112, a pair of inner sloped walls 114 which define a longitudinal slot 116 formed therebetween, a protrusion 118 defining a chamber 120 behind sloped walls 114, and a drain hole 122 formed in the lower portion of protrusion 118. However, in this embodiment, the pair of inner sloped walls 114 are staggered from front to back to created the slot 116 therebetween.

In accordance with the present invention, the distance that the walls 114 are staggered determines the width of slot 116. As discussed above with reference to FIGS. 1–6, the restriction created by slot 116 will cause the coffee grounds to soak within a given volume of water for a definite period of time. Thus, the coffee grounds will be properly steeped resulting in a rich and robust cup of coffee.

Walls 114 are connected to an inner surface of outer wall 112 and, in conjunction with protrusion 118, define chamber 120. Therefore, as the water flows through slot 116, which is defined by walls 114, it empties into chamber 120. Drain hole 122 is provided in the lower portion of protrusion 118 to drain all of the water that enters chamber 120. The water that exits through drain hole 122 will include the coffee flavor and will drain into a carafe or cup (not shown) positioned below the hole.

Figure 16:
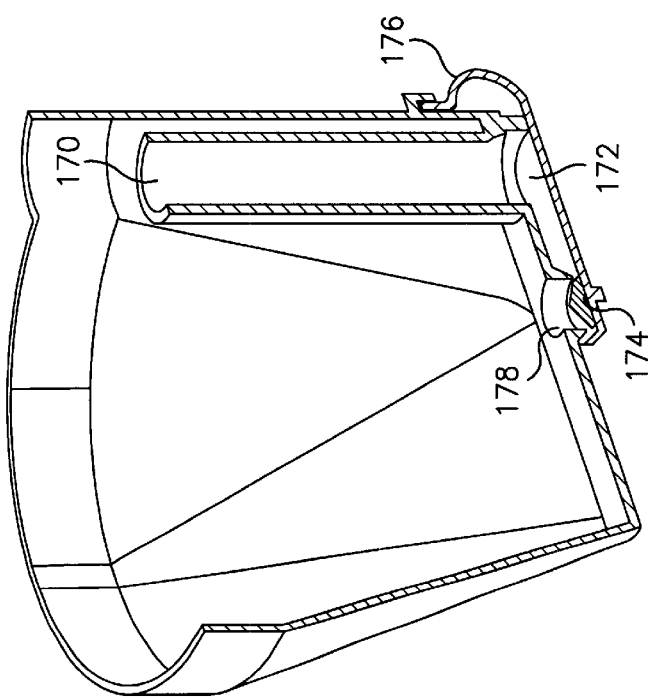
FIG. 16 is a cut-away perspective view illustrating another embodiment of a coffee maker filter basket with steeping feature in accordance with the present invention.

FIG. 16 illustrates yet another embodiment of a coffee maker filter basket with steeping feature in accordance with the present invention. FIG. 16 illustrates a coffee maker filter basket having an automatic means for restricting the flow of liquid through the basket and creating a dwell period within the basket. More specifically, a vertical overflow tube 170 is mounted above drain hole 172. A lower end of vertical overflow tube 170 is preferably molded around the perimeter of drain hole 172.

A bimetallic strip 176 is connected at a first end to a side of basket 100 adjacent to drain hole 172. A plug 174 is mounted on a second end portion of bimetallic strip 176. Plug 174 is sized and dimensioned to fit within a drain hole 178 formed in a central portion of a bottom of basket 100.

When liquid first enters basket 100 it is prevented from flowing through the drain hole 178 by plug 174 which is held in place by bimetallic strip 176. As the liquid level rises within basket 100, it will eventually begin to overflow into overflow tube 170. When the hot liquid flows over the top of overflow tube 170, it will drain down through drain hole 172 and contact bimetallic strip 176. As bimetallic strip 176 is heated, it will expand differentially thereby causing plug 174 to be removed from hole 178. Once plug 174 is removed from hole 178, the liquid within basket 100 will be able to flow out of the basket and into a carafe or cup.

Figure 17:
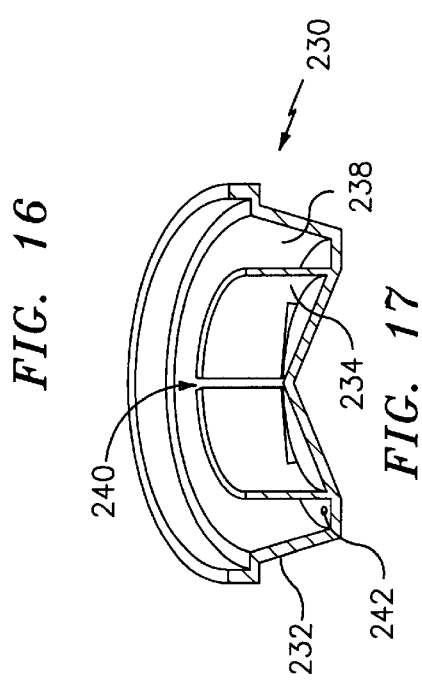
FIG. 17 is a partial cut-away perspective view illustrating another embodiment of a coffee maker filter basket with steeping feature in accordance with the present invention.
Figure 18:
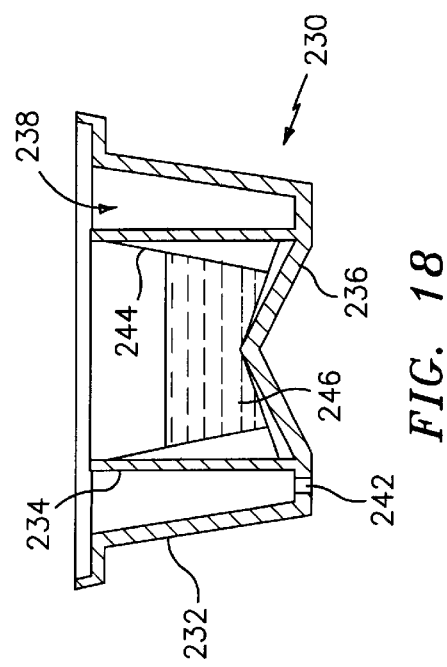
FIG. 18 is a partial cut-away side view illustrating the coffee maker filter basket with steeping feature as shown in FIG. 17.

Referring now to FIGS. 17 and 18, there is shown an alternative embodiment of the coffee maker filter basket 200 with a steeping feature in accordance with the present invention. Basket 230 is illustrated in a circular configuration, however it is contemplated that basket 230 may be configured in other configurations such as conical or square. Basket 230 includes an outer wall 232, an inner wall 234, and a base 236. Each of the outer wall 232 and inner wall 234 extend substantially perpendicular from base 236. Also, each of the outer wall 232 and inner wall 234 have a circular cross-section. However, the diameter of inner wall 234 is less than the diameter of outer wall 232 such that a channel 238 having a circular cross-section is defined between inner wall 234 and outer wall 232. At least one vertical slot 240 is formed in inner wall 234 such that water that enters the area defined by inner wall 234 will flow through slot 240 and into channel 238. In order to drain channel 238, at least one hole 242 is formed in base 236 adjacent to channel 238.

Accordingly, as illustrated in FIG. 18, filter 244 and coffee grounds 246 are placed within basket 230 within the portion defined by inner wall 234. Hot water is then dispensed over the coffee grounds 246 at a given flow rate. The water level will begin to rise within the portion of basket 230 defined by inner wall 234 since until enough of slot 240 is in contact with the water such that the flow rate of water entering the basket equals the flow rate of water through slot 240. Thus, as discussed above with reference to FIGS. 1 through 6, an equilibrium point will be reached at a given level of water. After the water passes over the coffee grounds and drains through slot 240, it will enter channel 238 where it will then drain through holes 242 and into a carafe or cup.

Although the illustrative embodiments of the present invention have been described herein with reference to the accompanying drawings, it is to be understood that the invention is not limited to those precise embodiments, and that various other changes and modifications may be affected therein by one having ordinary skill in the art without departing from the scope or spirit of the invention. For example, although the invention was described with reference to the application of hot water to coffee grounds, the invention may be used to brew other beverages (hot or cold) such as tea. It is also contemplated that the shape and size of the basket may vary to fit a particular filter or coffee maker configuration. All such changes and modifications are intended to be included within the scope of the invention as defined by the appended claims.

What is claimed is:

1. A filter basket comprising:
a body defining a receptacle and a drain opening, the drain opening being positioned externally of the receptacle; and a flow regulating member positioned between the receptacle and the drain opening, the flow regulating member including a longitudinal slot, the longitudinal slot being dimensioned to regulate fluid flow from the receptacle to the drain opening.

2. A filter basket according to claim 1, wherein the flow regulating member includes a pair of planar surfaces positioned within the receptacle, the planar surfaces being positioned to define the longitudinal slot.

3. A filter basket according to claim 1, wherein the longitudinal slot is vertically oriented within the receptacle.

4. A filter basket according to claim 1, wherein the flow regulating member is integrally formed with the body.

5. A filter basket comprising:
a wall configured to form a basket, said wall having a drain hole formed in a lower portion thereof; and
means for regulating a flow of liquid flowing into the basket into the drain hole;
wherein said means for regulating a flow of liquid comprises a pair of planar surfaces positioned within said basket and connected to an inner surface of said wall, said pair of planar surfaces defining a longitudinal slot therebetween.

6. The filter basket as recited in claim 5 wherein said longitudinal slot is defined by staggering the pair of planar surfaces.

7. The filter basket as recited in claim 5 wherein said slot has a first end and a second end wherein a width of the slot is greater in the first end than in the second end.

8. The filter basket as recited in claim 5 wherein a size of said slot is configured to restrict a flow of fluid through said basket to maintain a predetermined level of fluid within the basket for a predetermined dwell period.

9. The filter basket as recited in claim 8 wherein the predetermined dwell period is in the range of about five minutes to about seven minutes.

10. The filter basket as recited in claim 5 wherein said wall and said pair of planar surfaces define a chamber therebetween such that said drain hole is in fluid communication with said chamber.

11. The filter basket as recited in claim 5 wherein said wall is substantially conically shaped.

12. The filter basket as recited in claim 5 wherein said wall includes a first end and a second end, wherein said first end defines an inlet opening for receiving a filter and coffee grounds.

13. A filter basket comprising:
a wall configured to form a basket, said wall having a drain hole formed in a lower portion thereof; and
means for regulating a flow of liquid flowing into the basket into the drain hole;
wherein said means for regulating a flow of liquid comprises a planar surface positioned within said basket and connected to an inner surface of said wall, said planar surface having a longitudinal slot formed at least partially therein and a hole formed in a lower portion thereof.

14. A filter basket comprising:
a wall configured to form a basket, said wall having a drain hole formed in a lower portion thereof; and
means for regulating a flow of liquid flowing into the basket into the drain hole;
wherein said means for regulating a flow of liquid is adjustable, said adjustable means for regulating a flow of liquid comprises a tube mounted within said basket adjacent to said drain hole and an adjustment rod positioned within said tube, wherein each of said tube and said adjustment rod have a least one longitudinal slot formed therein for regulating the flow of liquid from said basket through said drain hole.

15. The filter basket as recited in claim 14 wherein said adjustment rod has a plurality of longitudinal slots of varying length formed therein.

16. A filter basket comprising:
a wall configured to form a basket, said wall having a drain hole formed in a lower portion thereof; and
means for regulating a flow of liquid flowing into the basket into the drain hole;
wherein said means for regulating a flow of liquid comprises a planar surface positioned within said basket and connected to an inner surface of said wall and a bimetallic strip, said planar surface having a longitudinal slot formed at least partially therein and a hole formed in a lower portion thereof, wherein said bimetallic strip is positioned adjacent to said planar surface and covers said longitudinal slot.

17. A filter basket comprising:
a wall configured to form a basket, said wall having a drain hole formed in a lower portion thereof; and
means for regulating a flow of liquid flowing into the basket into the drain hole;
wherein said means for regulating a flow of liquid comprises a tube mounted within said basket adjacent to said drain hole, a valve positioned within said tube and seated within the drain hole, and a bimetallic spring attached at a first end to an upper end of the valve and at a second end to a top of the tube, wherein movement of the spring causes movement of the valve to open or close the drain hole.

18. A filter basket comprising:
a wall configured to form a basket, said wall having a drain hole formed in a lower portion thereof; and
means for regulating a flow of liquid flowing into the basket into the drain hole;
wherein said means for regulating a flow of liquid comprises a tube mounted within said basket adjacent to said drain hole, a bimetallic strip connected at a first end to said wall, and a plug mounted on a second end of the bimetallic strip and positioned within a second drain hole formed in a lower portion of the wall.

19. A drip coffee maker comprising:
a water reservoir for storing a predetermined amount of water;
a heating element for heating the water stored in the water reservoir;
a filter basket for housing a coffee filter and coffee grounds;

a carafe for receiving the water after it passes over the coffee grounds and through the coffee filter; and a heating element for keeping the carafe of brewed coffee warm;

wherein the filter basket includes a wall configured to form a basket and means for regulating a flow of water flowing into the filter basket into a drain hole formed in the bottom of the filter basket, the regulating means an elongated slot formed in a wall of the filter basket, the elongated slot being positioned between a reservoir defined by the filter basket and drain opening.

20. A filter basket comprising:

a base having at least one drain hole formed therein;

an outer wall connected to and extending from said base; and an inner wall connected to and extending from said base, said inner wall having at least one slot formed therein, said outer wall and said inner wall defining a channel therebetween, wherein said drain hole formed in said base is in fluid communication with said channel.

21. The filter basket as recited in claim 20 wherein each of the outer wall and inner wall have a circular cross-section.

22. The filter basket as recited in claim 20 wherein said slot is perpendicular to a plane of the base.

23. A method of brewing a beverage comprising the steps of:

placing a plurality of beverage flavor elements within a filter basket;

dispensing water over the plurality of beverage flavor elements within said filter basket at a predetermine flow rate;

providing structure within the filter basket to restrict the flow of water through the filter basket such that a level of water in the basket rises to a predetermine level at which the flow rate of water into the filter basket equals a flow rate of water out of the basket; and continuing dispensing water over the plurality of beverage flavor elements for a predetermined dwell period after the flow rate of water into the filter basket equals the flow rate of water out of the basket.

24. The method of brewing a beverage as recited in claim 23 wherein the step of continuing dispensing the water is continued for a time period in the range of about five minutes to about seven minutes.

* * * * *